April 5, 1938.   T. L. SHEPHERD   2,113,498
RUBBER PROCESS
Filed Sept. 16, 1935
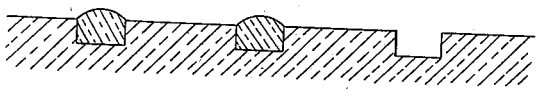
Fig.1.
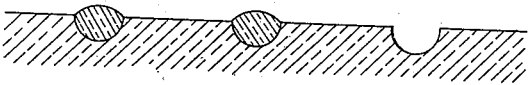
Fig.2.
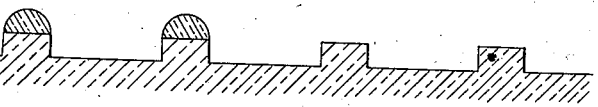
Fig.3.
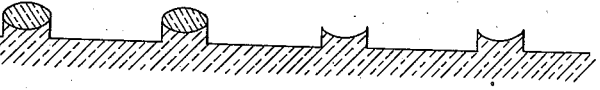
Fig.4.
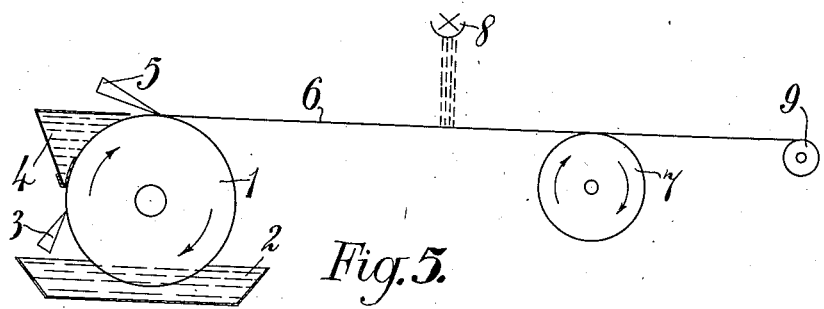
Fig.5.
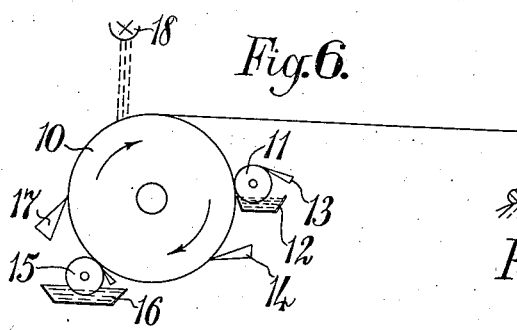
Fig.6.
Fig.7.
T. L. Shepherd
INVENTOR
By: Glascock Downing &c.
Attys.

Patented Apr. 5, 1938

2,113,498

UNITED STATES PATENT OFFICE 2,113,498

RUBBER PROCESS

Thomas Lewis Shepherd, London, England

Application September 16, 1935, Serial No. 40,860
In Great Britain September 18, 1934

6 Claims. (Cl. 18—54)

This invention relates to threads or filaments of rubber or the like elastic material, and has for its object a new process for making such threads and the like from coagulable dispersions of elastic materials such as latex, hereinafter termed latex, and also has for its object the thread produced by such process.

The invention consists in a process for forming rubber thread, which consists in coagulating latex with coagulant to form a coagulum of tape form, and curling the coagulum up by stretching to form a thread.

The invention also consists in a process as set forth in the preceding paragraph, in which comminuted material is fed on to one side of the coagulum before it is curled up.

The invention also consists in processes for forming rubber thread, substantially as described.

The invention also consists in apparatus for forming rubber thread, substantially as described with reference to the accompanying drawing.

The invention also consists in rubber thread formed from tape curled up.

In carrying the invention into effect by way of example, a roller or cylinder is provided with a series of narrow but flat or substantially flat surfaces either raised above the general surface of the roller or cylinder or else engraved or otherwise recessed into the general surface of the cylinder.

The roller or cylinder is arranged so that its lower portion is either immersed in a bath of coagulant or comes into contact with a second roller or cylinder which is itself immersed in a coagulant. The excess coagulant is removed by means of a doctor or wiper from the whole of the cylinder with the exception of the aforesaid narrow flat surfaces. Immediately this is done a stream of latex or the like is fed on to these flat surfaces and the excess removed by means of a second doctor. The remaining film of latex is coagulated by contact with the coagulant previously applied and the flat film or tape of coagulated rubber removed and passed over a second roller or cylinder moving at a higher speed thus applying stretch to the said film or tape.

It is found that the effect of this stretching operation is to gradually reduce the width of this film or tape until it becomes a thread which is more or less round in cross section, the film or tape automatically curling itself up into this shape whilst it is undergoing stretch and, since the tape consists of material which is to some extent in process of coagulating, coagulating finally into a thread.

A similar film or tape and resultant thread can be obtained by reversing the baths containing the coagulum and coagulant, the apparatus and process being otherwise exactly the same as already described.

The thickness or count of the thread is determined by the original width of the flat surface used and the setting of the doctor removing the excess of latex or the like and the speed of removal of the film from the cylinder and that of the final collecting bobbin.

It will be found that the thread produced has improved properties, apparently on account of the fact that the area over which coagulation takes place is greater in the case of a tape than in the case of a thread of the same area of cross section, and also on account of the stretching operation, which tends to increase the strength of the thread.

The method of production of this thread renders it particularly suitable for the addition of non-rubber material such as flock of textile origin; this may be placed or blown on to the flat surfaces between the application of the coagulant and that of the coagulum (or the reverse in the second method) or on to the film as it leaves the producing cylinder or applied during the curling up of the thread. In this way flock or other non-rubber materials may be thoroughly incorporated in with the substance of the thread as well as deposited on the exterior thereof. If deposited on one side of the film only the tape may be passed over a thin disc or surface in order to ensure that the film curls up with the treated surface outermost.

It is found that flock allows the thread to be coloured by dyes, and this effect is intensified when the flock is incorporated inside the thread.

Figures 1 to 7 of the accompanying drawing illustrate diagrammatically apparatus and details thereof which may be employed in carrying out the invention.

Figures 1 to 4 illustrate the preliminary formation of a tape-like coagulum by showing the shape of the surfaces of examples of rollers.

Figures 5 and 6 illustrate diagrammatically examples of the processes.

Figure 7 illustrates how the tape-like coagulum may be passed over a curved surface and have one face rendered concave.

Figures 1 and 2 show two examples of intaglio-engraved surfaces of rollers, the hollows representing grooves to hold latex or coagulant, some of these grooves being shown filled with the liquid. In this type of engraving the roller needs doctoring by means of a blade, the liquid still standing slightly up from the grooves after doctoring as a result of the surface tension of the liquid.

Figures 3 and 4 show examples of "surface engraved" roller surfaces, i. e. with upstanding ridges; this roller does not require doctoring by means of doctor blades. Some ridges are shown with liquid on, standing up from the ridges.

Figure 5 illustrates a suitable lay-out for carrying out the process and shows an engraved roller 1 picking up from bath 2 the coagulant which is then doctored off by blade 3 on the left. The engraving on the roller 1 is then covered with, say, latex from trough 4 and any surplus (when intaglio engraving is used) is doctored off by another blade 5. The coagulating thickish thread 6 is then run towards the right and stretched by a faster running roller 7 but before the coagulating thread reaches this roller it runs under a hopper 8 which covers it with comminuted matter, e. g. flock. After having passed roller 7 it is finally wound on a winding bobbin 9 which runs faster than the roller 7 so as to stretch the thread more and to ensure its shape being round in cross section.

Figure 6 shows an engraved roller 10 picking up the coagulant from a smaller roller 11 on the right running in a bath 12. This roller is doctored by a blade 13. The surface then runs under a doctor 14 and reaches another roller 15 running in a basin 16. This roller is also doctored. The roller 15 provides the required amount of latex and the surface runs again under a doctor blade 17. The engraving then comes underneath a flock box 18 which deposits comminuted matter on the coagulating thread in or on the engraving. The thickish thread is then run to the right and is treated as in Figure 5.

Figure 7 illustrates how the tape may be run over a curved surface so as to ensure that it curls up with the required side outermost.

Powdering, dusting, drying and other processes may be used as desired.

Any suitable dispersion of rubber may be used and the usual fillers, vulcanizing agents and the like incorporated in name; any known coagulant may be employed.

These methods of manufacture are equally applicable to mixtures of latex and non-rubber materials such as in my copending application No. 40,859 filed Sept. 16, 1935 (based on British applications Nos. 26,764/34, 26,765/34 and 26,767/34), and the term latex is to include latex with the usual compounding agents or with setting agents.

I claim:

1. A process for forming rubber thread, which consists in bringing latex and coagulant together so as to form a tape, and stretching such tape before the coagulation is completed, to such a degree and for such a period that the tape curls up and compacts into a thread.

2. A process for forming rubber thread, which consists in bringing latex and coagulant together so as to form a tape, in which one side is coagulating faster than the other, and stretching such tape before the coagulation is completed, to such a degree and for such a period that the tape curls up and compacts into a thread.

3. A process for forming rubber thread, which consists in bringing latex and coagulant together so as to form a tape, curving the tape in section, and stretching such tape before the coagulation is completed, to such a degree and for such a period that the tape curls up and compacts into a thread.

4. A process for forming rubber thread, which consists in bringing latex and coagulant together so as to form a tape, in which one side is coagulating faster than the other, curving the tape in section, and stretching such tape before the coagulation is completed.

5. A process for forming rubber thread consisting in bringing latex and coagulant together to form a tape, stretching the tape before coagulation is complete to such a degree and for such a period that the tape curls up longitudinally and compacts into a thread, and applying comminuted fibrous material to the tape during stretching.

6. A process for forming rubber thread consisting in bringing latex and coagulant together to form a tape, in which one side of the tape is coagulating faster than the other, stretching the tape before coagulation is completed, to such a degree and for such a period that the tape curls up longitudinally and compacts into a thread, and applying comminuted fibrous material during stretching.

THOMAS LEWIS SHEPHERD.